Nov. 2, 1948.  J. N. WOLFRAM  2,452,889
FLEXIBLE COUPLING
Filed Nov. 20, 1944  2 Sheets-Sheet 1
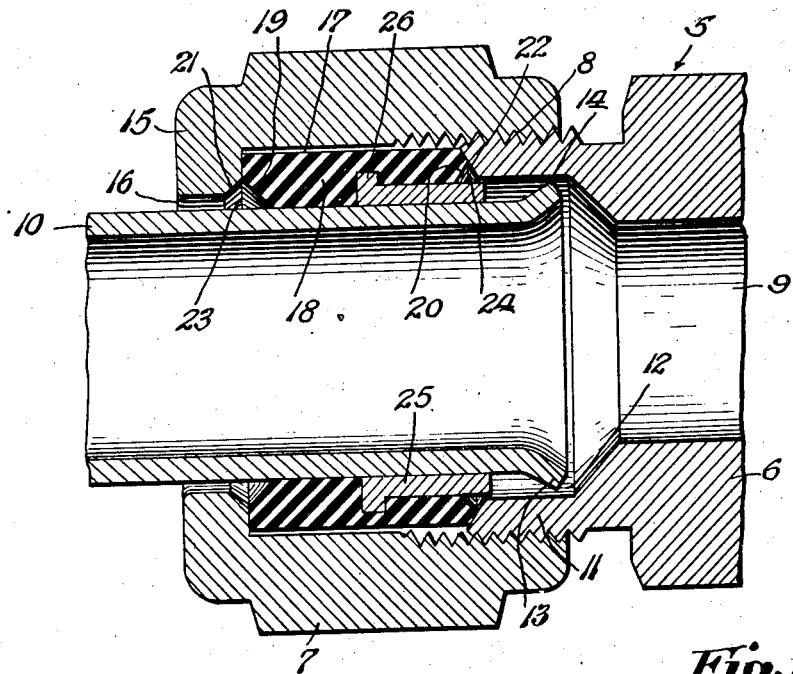
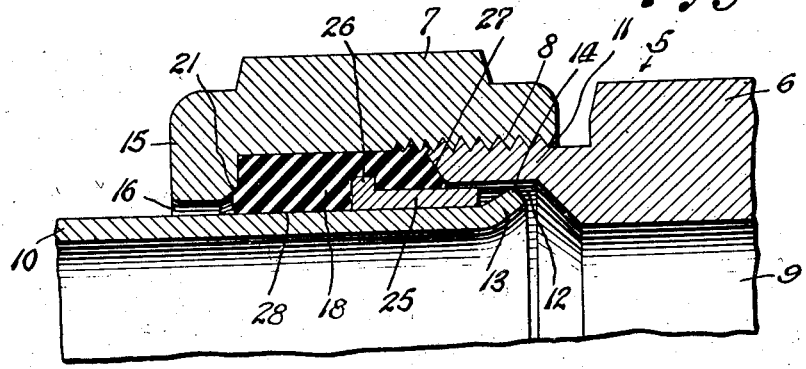
Inventor
John N. Wolfram
By Mason, Porter & Diller
Attorneys Nov. 2, 1948. J. N. WOLFRAM 2,452,889
FLEXIBLE COUPLING
Filed Nov. 20, 1944 2 Sheets-Sheet 2

Inventor
John N. Wolfram
By Mason, Porter & Diller
Attorneys

Patented Nov. 2, 1948

2,452,889

UNITED STATES PATENT OFFICE 2,452,889

FLEXIBLE COUPLING

John N. Wolfram, Cleveland, Ohio, assignor to The Parker Appliance Company, Cleveland, Ohio, a corporation of Ohio Application November 20, 1944, Serial No. 564,259

4 Claims. (Cl. 285—90)

The present invention relates to new and useful improvements in tube couplings and more particularly to improvements in a flexible coupling for flexibly clamping the end of a metal tube.

An important object of the invention is to provide a flexible tube coupling including threadedly engaged body and nut members defining therebetween an annular chamber for a deformable packing member of rubber or like material and a sleeve member embedded in said deformable packing member and closely surrounding the tube so as to prevent metal to metal engagement of the tube with the body and nut.

Another object of the invention is to provide a flexible coupling of the above character wherein one end of the sleeve telescopes within a counterbore of the body to prevent excessive deformation of the packing during tightening of the nut and at the same time prevent pinching of the packing during flexing.

A further object of the invention is to provide a flexible coupling of the above character wherein an effective seal is formed between the tube, body and nut.

A still further object of the invention is to provide a flexible coupling wherein the tube is free to move longitudinally a limited amount to compensate for tolerance variation in the length of tubes.

These and other objects will in part be obvious and will in part be hereinafter more fully disclosed.

In the drawing—

Figure 1 is a longitudinal view in section, showing a preferred form of coupling with the parts in their initially assembled position;

Figure 2 is a similar view in section showing the flexible coupling after the coupling members have been tightened relative to one another;

Figure 3 is a longitudinal view in section of a modified form of the invention, the parts being shown in their initially assembled position;

Figure 4 is a similar view in section after the coupling members have been tightened relative to one another.

Referring more in detail to the accompanying drawings, and particularly to Figures 1 and 2 thereof, the improved coupling is generally designated by the reference numeral 5 and includes a body member 6 and a nut 7 which threadedly engage one another as at 8. The body member 6 is provided with a central bore 9 of a diameter substantially equal to the diameter of the tube 10 being coupled.

The threaded end 11 of the body member 6 is provided with a counterbore as indicated at 12, in which is disposed the flanged or flared end 13 of the tube 10. The counterbore 12 is slightly larger in diameter than the flared end 13 so as to provide a clearance space 14, thus permitting free and easy movement of the tube 10 relative to the body member 6.

The nut 7 is formed with an inwardly extending portion 15 having a bore 16 providing a clearance space between the tube and the nut and said nut is further counterbored as indicated at 17 to form with the body member 6 an annular chamber for receiving a deformable packing member 18 of rubber or the like material. Referring to Figure 1 of the drawing, it will be noted that the packing member 18 is formed with inclined faces 19 and 20 which form with the inclined faces 21 and 22 of the nut and body member respectively, clearance spaces 23 and 24 for a purpose to be hereinafter more fully described. The packing member 18 is of annular formation and is shaped to closely engage the surface of the tube being coupled.

Closely surrounding the inner or flared end of the tube 10 is an annular metal sleeve 25 formed with a rib 26 adapted to be embedded in the packing 18. The end of the metal sleeve 25 telescopes within the body counterbore 12, there being a slight clearance provided to permit free flexing or vibration of the tube. The sleeve 25 prevents excessive deformation of the packing 18 during tightening of the nut and also prevents pinching of the packing during flexing. It will be noted from Figure 2 of the drawing that the clearance space between the end of the metal sleeve 25 and the body counterbore 12, and between the flared end 13 and the body counterbore 12 are substantially the same. The arrangement of the deformable packing 18 and metal sleeve 25 prevents metal to metal engagement of the tube with the body and nut.

The position of the tube 10 and the coupling members before the coupling members are tightened relative to one another is shown in Figure 1. When the nut 7 is moved relative to the body member 6, a deformation will take place in the packing 18 and at the same time the end of the metal sleeve 25 is moved into the counterbore 12. As the packing 18 is deformed by movement of the nut 7 a certain portion of the material will be extruded into the clearance spaces 23 and 24. These are the points at which the packing member is most apt to extrude during tightening of the nut. The coupling thus formed effects a tight seal between the packing member and body at 27 and between the packing and the tube at 28. The tube, however, is free to move longitudinally a limited amount to compensate for tolerance variation in the length of tubes.

The elastic packing member 18 is preferably molded to the shape shown in Figure 1 of the drawing so that there is no appreciable distortion thereof when positioned over the metal sleeve 25 while provision of the metal sleeve obviates any tendency of the packing to pinch and wear as the tube flexes and is subjected to pull-out strains. Pinching of the elastic packing will tend to wear the same and cause it to sludge off into the system.

The form of the invention shown in Figures 3 and 4 differs from the preferred form only in the shape of the inner end of the tube 10. The nut, body member, deformable packing and metal sleeve are the same in both forms. The inner end of the tube 10, however, is formed with a bead 29 with which the end of the sleeve 25 is in contact as the nut is tightened on the body member. The beaded end forms with the counterbore 12 a clearance space 30, permitting free and easy movement of the tube relative to the body member.

While the forms of the invention shown in the accompanying drawings provide for a substantial amount of free flexing movement of the tube it will be obvious to those skilled in the art that in high pressure installations where there is no appreciable flexing of the tube, the clearances between the tube 10 and nut bore 16 and between the sleeve 25 and body counterbore 12 can be reduced to a mere slip fit whereby fluid under high pressure and severe pullout strains on the tube cannot cause extrusion of the packing member 18 from its annular chamber. On the other hand when the coupling is properly assembled as shown in Figures 2 and 4 for low-pressure installations with substantial flexing of the tube, the initial clearances 23 and 24 prevent the packing member 18 from being deformed into the spaces between the sleeve 25 and the body counterbore 12 and between the nut bore 16 and the tube 10 whereby when the tube flexes there will not be any pinching of the packing member 18 in these spaces even though the tube flexes to such an extent as to close up these spaces.

It is obvious that minor changes in the details of construction may be made without departing from the spirit of the invention as set forth in the appended claims.

I claim:

1. A coupling for tubes comprising a threadedly engaged body member and nut defining therebetween an annular chamber, said body member being counterbored for receiving one end of the tube, a sleeve surrounding said tube and telescoping within said counterbore, and a deformable packing disposed within said annular chamber and around a portion only of said sleeve for sealing said tube within said coupling.

2. A coupling for a tube having an enlarged end comprising a threadedly engaged body member and nut defining therebetween an annular chamber, said body member being counterbored for receiving the enlarged end of said tube, a sleeve surrounding said tube adjacent the enlarged end thereof and telescoping within said counterbore, and a deformable packing disposed within said annular chamber and around a portion only of said sleeve for sealing said tube within said coupling, the enlarged end of the tube forming a holding shoulder for engagement with the sleeve when said tube is subjected to high pressure or pull-out strains.

3. A coupling for tubes comprising a threadedly engaged body member and nut, said body being counterbored for receiving the end of the tube being coupled, said nut having a bore at one end thereof and a counterbore communicating therewith, a sleeve surrounding said tube, a deformable packing disposed within said nut counterbore and around said sleeve for sealing said tube within said coupling, the meeting edges of said nut bore and counterbore being inclined, an inclined face on the threaded end of said body member, oppositely inclined faces on each end of said deformable packing disposed relative to the inclined faces of said nut and body members so as to provide clearance spaces, whereby upon movement of said nut on said body member to couple said tube, said packing member will be extruded into said clearance spaces.

4. A coupling for tubes comprising a threadedly engaged body member and nut, said body being counterbored for receiving the end of the tube being coupled, said nut having a bore at one end thereof and a counterbore communicating therewith, a sleeve surrounding said tube and having one end telescoping within said body counterbore, a deformable packing member disposed within said nut counterbore and around the major portion of said sleeve for sealing said tube within said coupling, the meeting edges of said nut member and counterbore being inclined, an inclined face on the threaded end of said body member, inclined faces on each end of said packing member corresponding to the inclined faces of said nut and body member to provide clearance spaces, whereby upon movement of said nut on said body member to couple said tube, said packing member wil be extruded into said clearance spaces.

JOHN N. WOLFRAM.

REFERENCES CITED

The following references are of record in the file of this patent:

UNITED STATES PATENTS

| Number | Name | Date |
|---|---|---|
| 1,848,198 | Reid | Mar. 8, 1932 |
| 2,300,584 | Martin | Nov. 3, 1942 |
| 2,344,698 | Howe | Mar. 21, 1944 |
| 2,365,574 | McWane | Dec. 19, 1944 |